UNITED STATES PATENT OFFICE 3,767,684
Patented Oct. 23, 1973

3,767,684
PROCESS FOR THE PREPARATION OF 6,6-DI-
FLUORO - 11β,17α,21 - TRIHYDROXYPREGN-4-
ENE - 3,20-DIONE AND OF ITS 16-METHYL
HOMOLOGS
Richard M. Scribner, Wilmington, Del., assignor to E. I.
du Pont de Nemours and Company, Wilmington, Del.
No Drawing. Continuation-in-part of application Ser. No.
105,665, Jan. 11, 1971, which is a continuation-in-part
of application Ser. No. 31,002, Apr. 22, 1970. This
application Oct. 19, 1971, Ser. No. 190,681
Int. Cl. C07c 169/30
U.S. Cl. 260—397.4                                              8 Claims

ABSTRACT OF THE DISCLOSURE

Antiinflammatory and glucocorticoidal 6,6-difluoro-11β, 17α,21-trihyrdroxypregn-4-ene-3,20-dione, optionally substituted with an α- or β-methyl at C-16, the corresponding 21-esters and related 1,4-dienes, are made from 6,6-difluoro-3,17-diacetoxypregnane-20-ones in which the 5α-positions are substituted wtih either a fluorine or a chlorine atom. Instead of the 17α-acetoxy group, the 17α-hydroxyl can be present. The reaction sequence includes hydrolysis of the 3-acetoxy group and bromination at C-21; oxidation of the C-3 hydroxyl to the keto group; reaction with silver acetate and/or sodium acetate which gives the Δ⁴-3,20-diketo-17α,21-dihydroxysteroid 21-acetate; hydrolysis of the 21-acetoxy group; and microbiological hydroxylation at C-11. Also described is dehydrogenation to give the Δ¹,⁴-triol, conversion to the corresponding 9α-fluoro steriod, especially 6,6,9α-trifluoro-11β,17α,21-trihydroxy-16α-methylpregna-1,4-diene, and its 21-esters. Methods for making the starting materials also are described.

CROSS REFERENCE TO RELATED APPLICATION

This application is a continuation-in-part of my copending application Ser. No. 105,665 filed Jan. 11, 1971, which is in turn a continuation-in-part of my application Ser. No. 31,002, filed Apr. 22, 1970.

BACKGROUND OF THE INVENTION

Field of the invention

This invention relates to a process for the preparation of certain 6,6-difluoro-3-keto-17,21-dihydroxypregn-4 - enes, which are useful as precursors to antiinflammatory and glucocorticoid agents suitable for the treatment of allergic diseases, collagen diseases, skin diseases, and the like.

Prior art

U.S. Pat. 3,219,673 (to Boswell) describes a general process for preparing 6,6-difluoro-3-keto-Δ⁴-steroids in which the substituents at C-17 can be among others β-hydroxyl, α- or β-acetoxyl, β-acetyl, and α-methyl. This patent does not disclose 6,6-difluoro-3-keto-Δ⁴-steroids having either the COCH₂OH substituent or derivatives thereof. It is well known that the 21-hydroxy group is quite reactive and obviously would not survive certain reaction steps of the Boswell process, such as the conversion of the 6-keto group to the 6,6-difluoro group by means of SF₄. Yet, many known biologically active steroids are derived from 17,21-dihydroxy-20-ketopregn-4-ene, while a new class of very active antiinflammatory agents have the 6,6-difluoro-17,21-dihydroxy-20-ketopregn-4-ene structure.

There is a need, therefore, for a reliable and inexpensive process for the production of such 17,21-dihydroxy-20-ketopregn-4-ene derivatives.

SUMMARY OF THE INVENTION

According to this invention, it has now been discovered that a 6,6-difluorosteroid of Formula 1

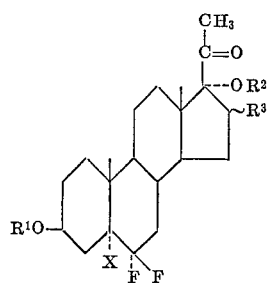

(1)

in which

R¹ and R² each individually is hydrogen or lower (1–4 carbon) alkanoyl group, especially acetyl;
R³ is α- or β-hydrogen or methyl; and
X is fluorine or chlorine, can be converted in a few steps to the Δ⁴-6,6-difluoro-3-ketosteroid of Formula 2, in which the meaning of R³ is the same as above

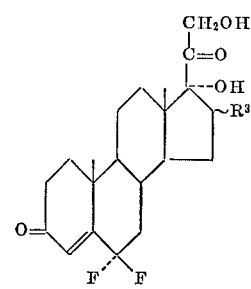

(2)

Compounds of Formula 2 can be microbiologically hydroxylated in position C-11 to the compounds of Formula 3

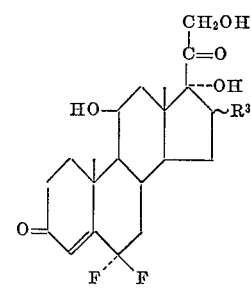

(3)

which are potent antiinflammatory agents. The latter can be Δ¹-dehydrogenated and/or converted to the corresponding 9α-fluorosteroids of Formula 4 as described herein to provide potent antiinflammatory agents where a is a single or double bond.

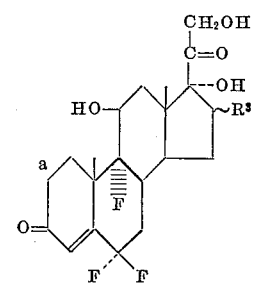

(4)

The reaction sequence for the preparation of compounds of Formula 2 involves the following steps:

(A) If the starting material 1 is in the form of 3-acetoxy steroid, it is hydrolyzed to the 3-hydroxy steroid;

(B and C) The 3-hydroxy steroid is brominated at C-21, then oxidized to the corresponding 21-bromo-3-ketosteroid, or alternatively the 3-acetoxy form of 1 is brominated at C-21 and then hydrolyzed to the 3-hydroxy steroid which is oxidized to the same 21-bromo-3-ketosteroid;

(D and E) The last named compound is converted by sodium acetate and acetic acid preferably in the presence of silver acetate to the corresponding 21-acetoxy-$\Delta^4$-3-ketosteroid, which can be readily hydrolyzed to the corresponding compound 2.

(F) Compound 2 is converted to Compound 3 by microbiological oxidation.

In addition to Compounds 3 and 4, some of the intermediates obtained in this process have themselves valuable biological properties.

DETAILED DESCRIPTION OF THE INVENTION

The reaction sequence involved in the process of the present invention can be illustrated by the following Scheme 1.

Scheme 1

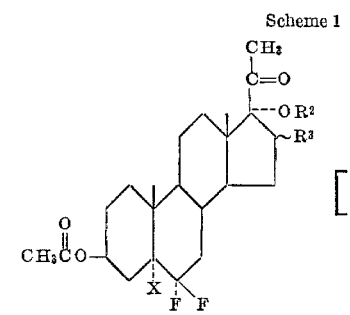

[Formula 1; $R^1$=CH$_3$—$\overset{O}{\underset{\|}{C}}$—]

Step A | NaOH, MeOH—THF

Step A′ | Br$_2$—Dioxane

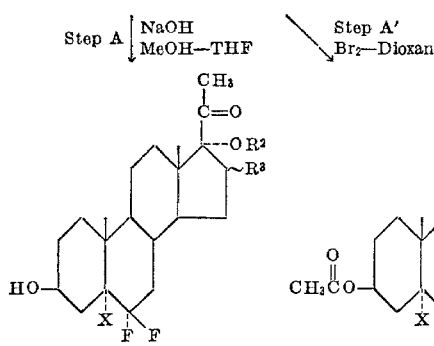

Step B | Br$_2$—Dioxane

Step B′ | HCl, MeOH, H$_2$O

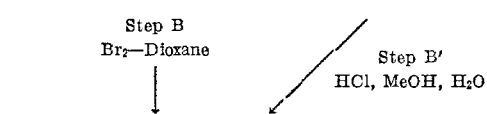

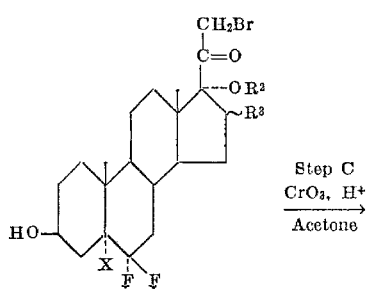

Step C
CrO$_3$, H$^+$
─────────→
Acetone

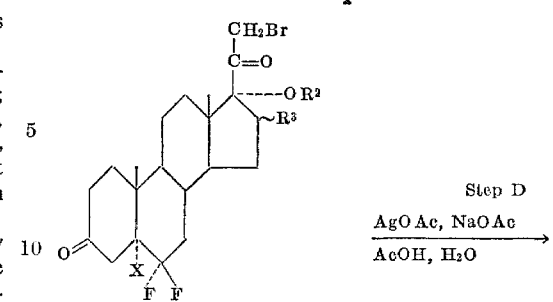

Step D
AgOAc, NaOAc
─────────→
AcOH, H$_2$O

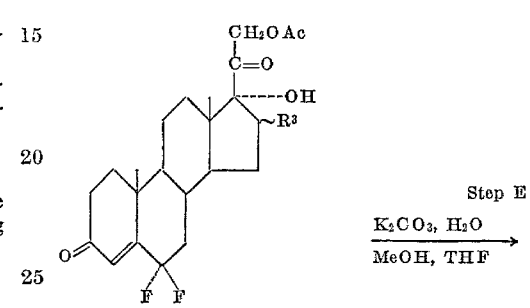

Step E
K$_2$CO$_3$, H$_2$O
─────────→
MeOH, THF

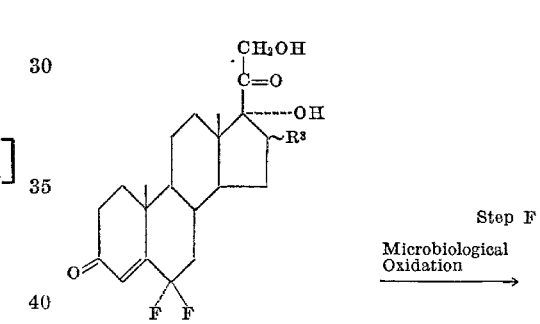

(2)

Step F
Microbiological
Oxidation
─────────→

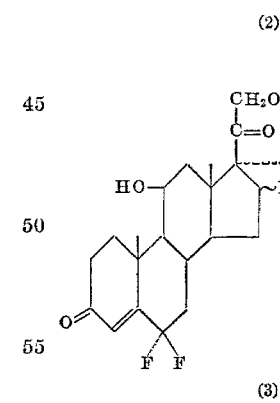

(3)

Compound 4 wherein $a$ is a double bond is obtained from (3) by the following reactions (3)

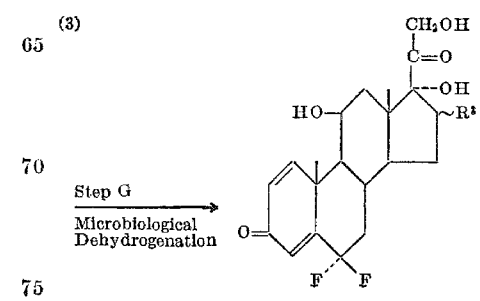

Step G
Microbiological
Dehydrogenation
─────────→

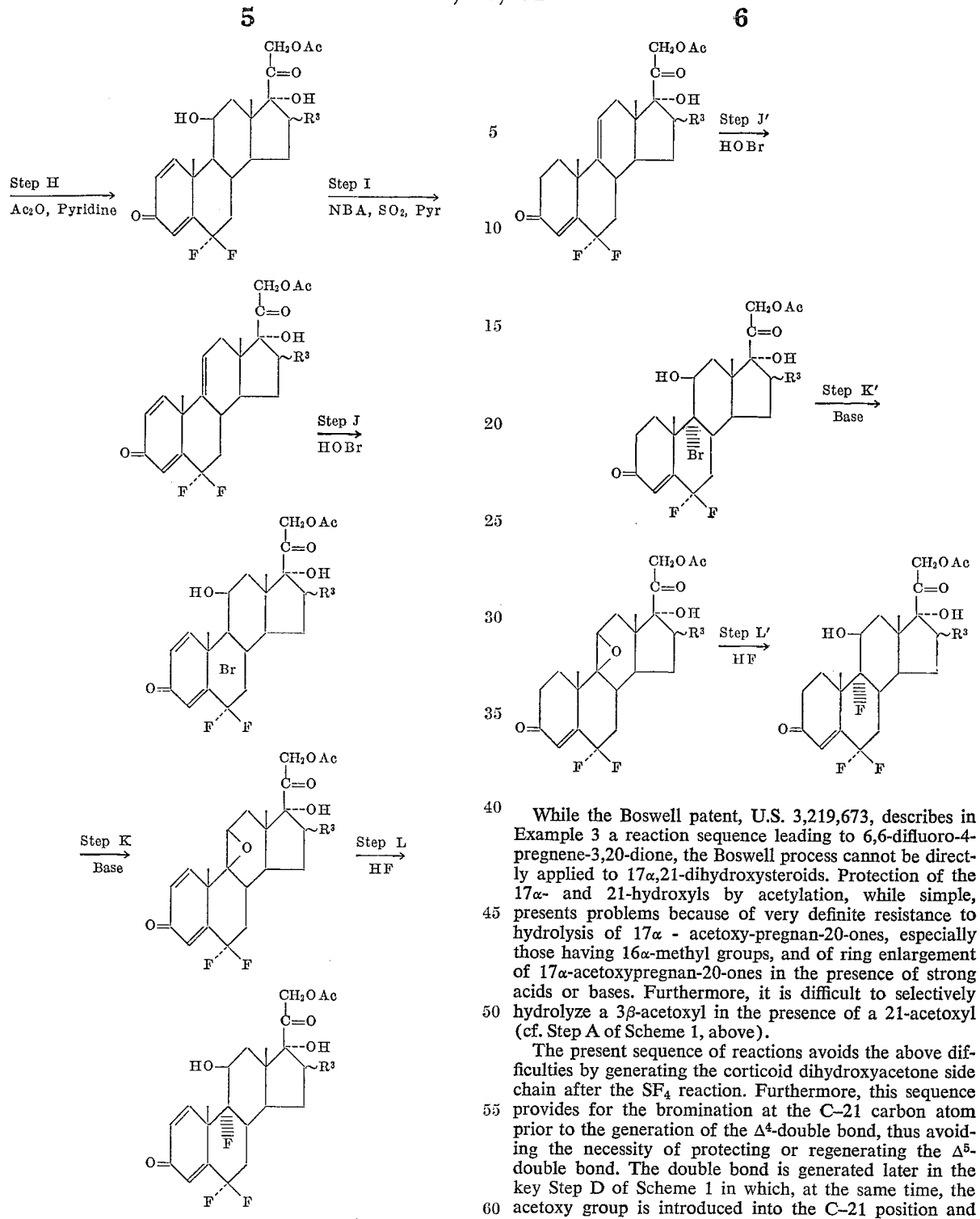

When a is a single bond, the corresponding compound results from the reactions as shown below:

(3)

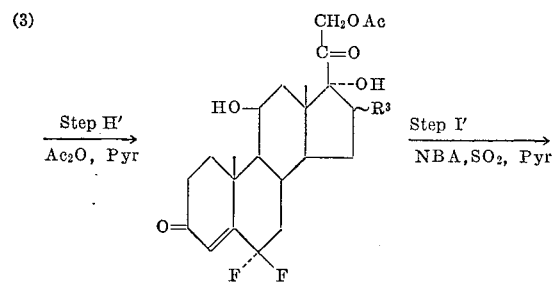

While the Boswell patent, U.S. 3,219,673, describes in Example 3 a reaction sequence leading to 6,6-difluoro-4-pregnene-3,20-dione, the Boswell process cannot be directly applied to 17α,21-dihydroxysteroids. Protection of the 17α- and 21-hydroxyls by acetylation, while simple, presents problems because of very definite resistance to hydrolysis of 17α - acetoxy-pregnan-20-ones, especially those having 16α-methyl groups, and of ring enlargement of 17α-acetoxypregnan-20-ones in the presence of strong acids or bases. Furthermore, it is difficult to selectively hydrolyze a 3β-acetoxyl in the presence of a 21-acetoxyl (cf. Step A of Scheme 1, above).

The present sequence of reactions avoids the above difficulties by generating the corticoid dihydroxyacetone side chain after the $SF_4$ reaction. Furthermore, this sequence provides for the bromination at the C–21 carbon atom prior to the generation of the Δ⁴-double bond, thus avoiding the necessity of protecting or regenerating the Δ⁵-double bond. The double bond is generated later in the key Step D of Scheme 1 in which, at the same time, the acetoxy group is introduced into the C–21 position and the 17α-acetoxy group is hydrolyzed. Conventional syntheses of 21-bromopregnane-20-ones starting from Δ⁵-pregnene-20-ones require protection of the C–5 double bond (e.g. as the dibromide) which must later be regenerated (e.g. by treatment with zinc) after bromination of the C–21 methyl group.

The Starting Compound 1 in which X is fluorine and R' is acetyl can be made by a process analogous to that described in the above cited U.S. Pat. 3,219,673 comprising the steps of adding NOF to the appropriate Δ⁵-steroid, thus forming the 5α-fluoro-6-nitriminosteroid; hydrolyzing the nitrimino group to the keto group, preferably by contacting the material with neutral alumina containing about 6% water; and fluorinating the C–6 position with $SF_4$ in the presence of a Lewis acid.

These reactions are shown in Scheme 2, below:

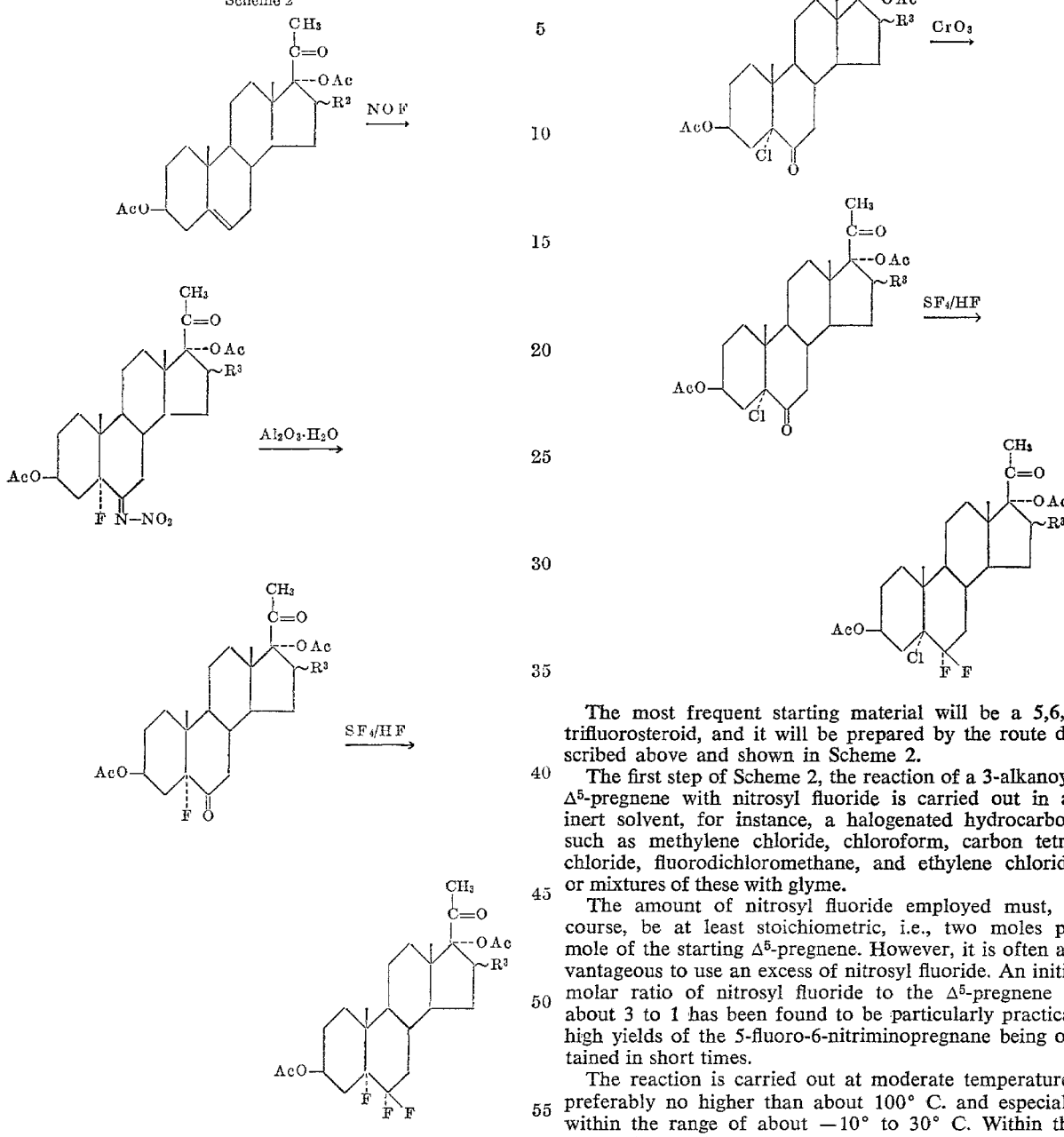

When X is chlorine, the Starting Compound 1 in which R² is acetyl can be made from the suitable Δ⁵-steroid by the following general route, illustrated below in Scheme 3.

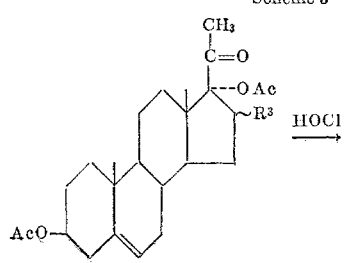

The most frequent starting material will be a 5,6,6-trifluorosteroid, and it will be prepared by the route described above and shown in Scheme 2.

The first step of Scheme 2, the reaction of a 3-alkanoyl-Δ⁵-pregnene with nitrosyl fluoride is carried out in an inert solvent, for instance, a halogenated hydrocarbon, such as methylene chloride, chloroform, carbon tetrachloride, fluorodichloromethane, and ethylene chloride, or mixtures of these with glyme.

The amount of nitrosyl fluoride employed must, of course, be at least stoichiometric, i.e., two moles per mole of the starting Δ⁵-pregnene. However, it is often advantageous to use an excess of nitrosyl fluoride. An initial molar ratio of nitrosyl fluoride to the Δ⁵-pregnene of about 3 to 1 has been found to be particularly practical, high yields of the 5-fluoro-6-nitriminopregnane being obtained in short times.

The reaction is carried out at moderate temperatures, preferably no higher than about 100° C. and especially within the range of about −10° to 30° C. Within this range, the reaction rates are satisfactory and can be easily controlled. Atmospheric pressure is sufficient. Moisture is undesirable in this step because of the danger of NOF hydrolysis.

The nitrosyl fluoride adduct obtained in the first step, the 5-fluoro-6-nitriminopregnane, can be isolated in any conventional manner, such as for example evaporation of the solvent and recrystallization of the residue. In practice, this isolation and purification step is not required, and the crude solution can be directly subjected to the next step, i.e. conversion of the nitrimino group to the keto group.

The solution is first contacted with a weak base, such as an aqueous alkali bicarbonate, to remove excess NOF and acidic side reaction products. The solution is then chromatographed on neutral alumina containing 5–15% by weight of water (activity grade III). The 5-fluoro-6-ketopregnane formed in this step is eluted with a suitable solvent or a solvent combination, such as aliphatic or aromatic hydrocarbons. Instead of the chromatographic technique, any other suitable technique for contacting the fluoronitriminopregnane with wet alumina can be used; for example, vigorously stirring a suspension of alumina in the fluoronitriminopregnane solution. Alternatively, the nitrimino group can be hydrolyzed by refluxing a solution of the steroid in aqueous dioxane.

The reaction of the 5-fluoro-6-ketopregnane obtained in the second step with sulfur tetrafluoride/hydrogen fluoride or sulfur tetrafluoride/Lewis acid mixture is carried out in an inert solvent of the same type as those used in the first step, i.e., methylene chloride, chloroform, carbon tetrachloride, fluorodichloromethane, ethylene chloride, and the like. Sulfur tetrafluoride can be replaced by selenium tetrafluoride or by an organosulfur fluoride, such as phenylsulfur trifluoride, but sulfur tetrafluoride is the cheapest and the most readily available reagent. Since both sulfur tetrafluoride and hydrogen fluoride are gases at the reaction temperatures, it is practical to carry out this step in a closed reactor, such as a shaking, sealed plastic bottle or steel autoclave. The reaction is best carried out at moderate temperatures, below about 100° C., and preferably at −10 to 30° C. It usually is not practical to lower the temperature below about −10° C. because the reaction rates are too low for an efficient operation.

Although other fluoro Lewis acids, such as $BF_3$ or $SbF_3$ can be used, hydrogen fluoride, either added directly or generated in situ is preferred. The relative proportions of sulfur tetrafluoride and of hydrogen fluoride can be varied within a rather broad range; the molar proportion of hydrogen fluoride to steroid can be as low as 1 to 1 or as high as 20 to 1, the 5–10 to 1 range being preferred. The molar proportion of sulfur tetrafluoride to steroid can be as low as 1 to 1, but the range of 2–10 to 1 is preferred. Higher ratios, e.g., 25 to 1 can be used but are wasteful of sulfur tetrafluoride. The 5,6,6-trifluoropregnane can be recovered by conventional methods, such as evaporation of solvent and recrystallization of the residue or column chromatography.

As mentioned above, a 5-chloro-6,6-difluorpregnane can be used as the starting material in the process of this invention. Addition of hypochlorous acid to the appropriate $\Delta^5$-pregnene is normally carried out in an aqueous solvent such as methanol, ethanol, acetone, dioxane, or tetrahydrofuran in a slightly acidic medium. The reaction temperature is maintained at about −20 to 35° C. Excess hypochloric acid may be destroyed by means of a reducing agent, such as sodium sulfite, and the 5-chloro-6-hydroxysteroid is recovered either by extraction or by precipitation in the presence of a large volume of water.

The 6-hydroxyl is readily oxidized to the 6-keto group by means of a conventional oxidizing agent, such as chromic acid. The oxidizing agent is added to the 5-chloro-6-hydroxysteroid in an aqueous acetone solution. The reaction temperature is maintained below about 30° C. The resulting 5-chloro-6-ketosteroid can be isolated by any suitable means and purified by recrystallization or by chromatography.

Fluorination of the 6-keto group follows substantially the same procedure as described above for Scheme 2.

Step A of the present process, selective hydrolysis of the C–3 ester group in the presence of the 17α-acetoxy group, is accomplished by contacting a solution of the steroid in a water-miscible solvent with aqueous alkali, such as sodium or potassium carbonate, or sodium hydroxide. This step is usually carried out at room temperature, but the temperature range of about −10° to 35° C. can conveniently be employed. Suitable solvents include lower alcohols, such as methyl, ethyl, propyl, isopropyl and t-butyl; and water-miscible ethers, such as tetrahydrofuran and dioxane. Methyl alcohol/tetrahydrofuran mixtures are preferred because of their good solvent properties towards both the steroid compounds and the aqueous alkali.

In Step B, the corticoid methyl group is brominated to the 21-bromo derivative. Bromine is usually dissolved in a solvent such as dioxane, tetrahydrofuran, chloroform, or carbon tetrachloride, although dioxane is preferred because it minimizes oxidation of the 3 β-hydroxyl group by bromine. The reaction temperature is preferably kept below 75° C.

As shown in scheme 1, Steps A and B can be reversed—see Steps A′ and B′. For the latter, hydrolysis of the 3β-acetoxy is best carried out under acid conditions to avoid reaction of the base-sensitive C–21 bromo group.

The 3-hydroxyl group is oxidized in Step C to the 3-keto group with any conventional acidic or neutral reagent. Aqueous chromic acid is the preferred oxidizing agent. The 3-hydroxysteroid is dissolved in a water-miscible ether or ketone, e.g. dioxane, tetrahdyrofuran, acetone, or methyl ethyl ketone. The reaction is carried out at or below room temperature, although a temperature of up to about 35° C. can be used.

Step D is the critical step of the present process. It accomplished not only dehydrohalogenation to the $\Delta^4$-3-keto system but also substitution of the 21-bromine atom with the 21-acetoxy group, as well as replacement of the otherwise difficult to hydrolyze 17α-acetoxy group with the 17α-hydroxyl. While no definite theory is proposed, it is possible that the reaction involves migration of the 17α-acetyl to the 21 position via a cyclic oxonium ion intermediate, A, which is opened with water to the desired 17α-hydroxy-21-acetoxy-20-one. This hypothetical mechanism is shown below.

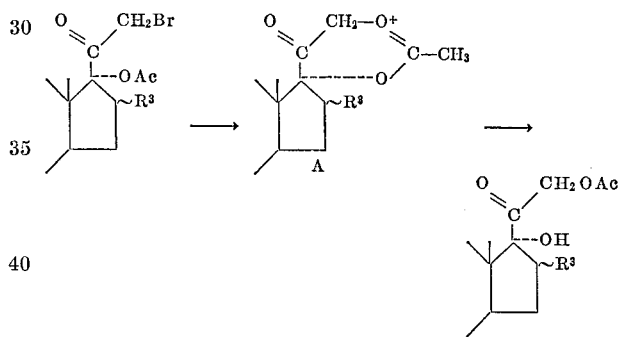

Although the above discussion of Step D considers the case when $R^2$ is acetyl, the same product is obtained when $R^2$ is hydrogen, i.e., the sequence of reactions starts with a 17-hydroxysteroid. In such a case, the reaction mechanism in Step D most likely is different and probably involves a simple replacement of the C–21 bromine with an acetyl group.

A mixture of sodium acetate and preferably silver acetate in moist acetic acid is used in this step. The ratio of components used does not appear to be critical, although one mole of silver salt for each mole of 21-bromo steroid is preferred. Sodium acetate is used to increase the concentration of acetate ion in the medium while minimizing the use of the more expensive silver salt. Anhydrous acetic acid can be employed, instead of aqueous acetic acid; under these conditions, hydrolysis of the oxonium intermediate probably occurs when the reaction mixture is poured into water. When aqueous acetic acid is used in this reaction, it usually contains about 0.5–1 vol. percent of water. Step D is conveniently carried out at reflux temperature, but lower temperatures and longer reaction times can be used.

Hydrolysis of the C–21 acetyl group in Step E is facile and is easily accomplished by conventional hydrolysis techniques. A mild base, such as sodium or potassium carbonate or dilute aqueous sodium hydroxide will hydrolyze the ester group at room temperature. This step is carried out in a water-miscible solvent, such as methanol, ethanol, dioxane, tetrahydrofuran, acetone or the like. The hydrolysis requires from a few minutes to at most a few hours. It can be accelerated by slight warming, although heating to high temperatures should be avoided.

Compound 2 obtained in Step E, above, is microbiologically hydroxylated to the 11β-hydroxysteroid (3), as shown in Scheme 1. A microorganism such as *Curvularia lunata* or *Curvularia pallescens* is used for this purpose. This microbiological hydroxylation at C–11 is well known to the art. The final products of Formula 3 are potent antiinflammatory agents, which also have glucocorticoid activity.

A typical microbiological hydroxylation can be carried out according to the following procedure: *Curvularia lunata* (ATCC 12017 or NRRL 2380) is maintained at 23–25° C. for 14 to 16 days on agar slants having the composition

| | |
|---|---|
| Malt extract _____g__ | 20 |
| Peptone _____g__ | 1 |
| Dextrose _____g__ | 20 |
| Agar _____g__ | 15 |
| Distilled water _____ml__ | 1000 |

A soybean meal-Cerelose medium containing

| | |
|---|---|
| Soybean meal _____g__ | 5 |
| Cerelose (dextrose) _____g__ | 20 |
| Yeast extract _____g__ | 5 |
| Sodium chloride _____g__ | 5 |
| Potassium dibasic phosphate _____g__ | 5 |
| Distilled water _____ml__ | 1000 | is adjusted to pH of 6.5 by addition of hydrochloric acid and the microorganism transferred to it from the agar slants and grown for 28 hrs. in 250 ml. Erlenmeyer flasks each containing 100 ml. of the soybean-Cerelose medium while on a rotary shaker. A flask of the growing culture is used to inoculate 400 ml. of the same medium in a 2 l. flask. The culture is grown for 18 hrs. on a shaker, and about 2.5 g. of compound 2 dissolved in 60 ml. of dimethylformamide is distributed equally among thirty 2 l. flasks and incubation continued for 120 hrs. The combined products are acidified with acetic acid to pH 4 and extracted successively with 8.5, 4.8 and 1.6 l. of chloroform. The extract is washed with water and dried over anhydrous sodium sulfate, and the solvent is removed by evaporation. Compound 3 can be isolated from the evaporation residue by any conventional means, such as chromatography and/or crystallization.

The antiinflammatroy activity of the final 6,6-difluoro-11β-hydroxysteroids is often further enhanced by the introduction of a Δ¹-double bond. This also can be done microbiologically, as hereafter described.

Microbiological dehydrogenation in the 1,2-position is effected by *Arthrobacter simplex* which is maintained on agar slants from 1 g. of dextrose, 1 g. of yeast extract, 2 g. of agar, and 96 ml. of water. The organism is transferred to a nutrient broth (commercially available from Difco). The growth, inoculation, incubation, extraction, and isolation are carried out by the general procedures for the 11β-hydroxylation.

The final antiinflammatory steroids, whether or not 1,2-unsaturated, are useful in the treatment of allergic, collagen, skin and musculoskeletal diseases. They can be administered orally, parenterally or topically with dosage rates generally in the range of 0.0001 to 1 mg. per kg. of body weight per day.

These antiinflammatory steroids, whether or not unsaturated in the 1,2-position, can be converted to the corresponding 9α-fluoro steroids. The latter are generally more effective as antiinflammatory agents. Their synthesis is accomplished by dehydrating the 11-hydroxysteroid to give the $\Delta^{9,11}$ unsaturation, adding HOBr to give the 9α-bromo-11β-ol, dehydrobrominating to give the 9β,11β-epoxide and adding HF to the epoxide grouping (see Steps G–L and G'–L' of Scheme 1).

The novel starting materials of Formula 1, above, as well as several novel intermediates, including those of Formula 2, are thus particularly useful in the preparation of these antiinflammatory steroids by the present process. Some of these compounds, in addition, have useful biological properties of their own.

The invention is now illustrated by the following representative examples.

All temperatures are reported in degrees centigrade. The symbol Ac in formulas stands for the acetyl group, $CH_3-CO-$. Methyl groups in positions 10 and 13 are indicated by vertical lines. The symbol Py stands for pyridine. The abreviation MeOH designates methyl alcohol, and THF designates tetrahydrofuran.

EXAMPLE 1

6,6-difluoro-17α,21-dihydroxy - 16α - methylpregn - 4-ene-3,20-dione(12) and 6,6,9α - trifluoro - 11β,17α,21-trihydroxy-16α-methylpregna - 1,4 - diene-3,20-dione (20) and esters (a) 3β,17α - dihydroxy - 16α - methylpregn-5-en-20-one-3-acetate (4)

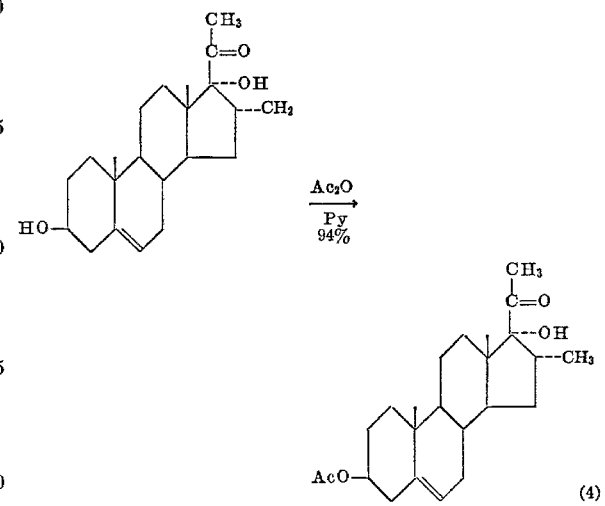

To a mixture of 1 l. of pyridine and 325 g. of 3β,17α-dihydroxy-16α-methylpregn-5-en-20-one was added, from a dropping funnel, 200 ml. of acetic anhydride. The mixture was warmed to 65–70° and held at that temperature for 4 hrs. It was then cooled to room temperature and poured with vigorous stirring into 6 l. of water. After about 0.5 hr. the solid was collected by filtration and washed thoroughly with fresh water in a mechanical blender. The ground solid was collected by filtration, washed with water again and dried to a constant weight in a vacuum oven at 110–120°, giving about 350 g. of the monoacetate (4). The monoacetate (4) was characterized by NMR spectroscopy: NMR H¹(CDCl₃, TMS) Hz. at 60 mHz. 322 (broad, 1, C–6 vinyl), 134 (s, 3, C–21 CH₃), 121 (s, 3, OAc) 61 (3, s, C–19 CH₃), 54 (3, d, J=7 Hz., C–16 CH₃), 48 (3, s, C–18 CH₃).

(b) 3β,17α - dihydroxy - 16α - methylpregn - 5 - en- 20-one 3,17-diacetate (5)

A solution of 120 g. of p-toluenesulfonic acid hydrate in 1 l. of reagent grade acetic anhydride was stirred at room temperature for 0.5 hr. and then 200 g. of the monoacetate (4) was added. The mixture was stirred at room temperature for 3–5 hours, even though the dissolution of the steroid was essentially complete in about one hour. Acetylation at higher temperature or for longer periods than about 5 hours caused extensive D-homoannulation of the steroid. The reaction mixture was poured into 6 l. of vigorously stirred water, cooling with ice if necessary to keep the temperature below 40°. After stirring for 1 hr., the water was decanted from the solid and replaced with fresh water. After an additional hour the solid was collected by filtration, taken up in 1.5 l. of methylene chloride, washed successively with saturated NaHCO₃ and NaCl solutions, and dried over MgSO₄. Gradual replacement of the methylene chloride by methanol at boiling temperature gave in several crops 164 g. of crystalline diacetate (3), M.P. 173–176°; NMR H¹(CDCl₃, TMS) Hz. at 60 mHz. 326 (broad, 1, C–6 vinyl), 130 (s, 3, C–21 CH₃), 122 (s at 500 Hz. s.w., 6, C–3 and C–17 OAc), 62 (s, 3, C–19 CH₃), 54 (d, 3, J=7 Hz., C–16 CH₃), 42 (s, 3, C–18 CH₃).

(c) 3β,17α - dihydroxy - 5α - fluoro - 16α - methylpregnane-6,20-dioine diacetate (6)

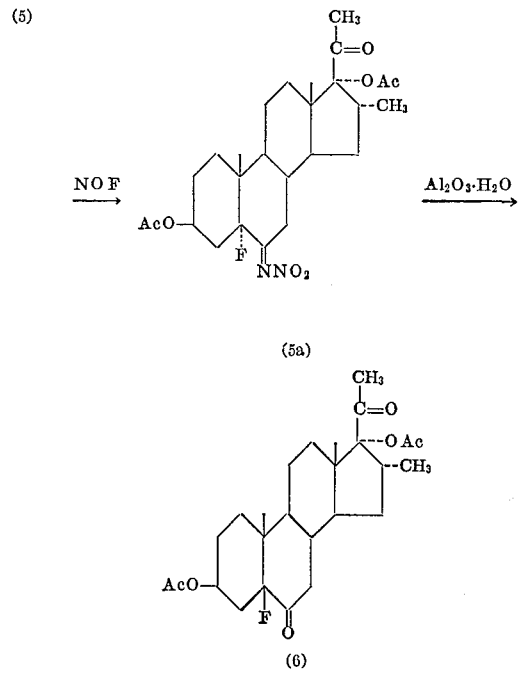

A solution of 75 g. of the diacetate (5) in 300 ml. of methylene chloride with 10 g. of anhydrous sodium fluoride in a polyethylene bottle was purged with nitrogen through a polyethylene bubbler, and then nitrosyl fluoride (24–27 g.) was bubbled into the stirred reaction mixture over a period of 6–8 hours. The reaction mixture was purged with nitrogen again, diluted with more methylene chloride, and washed successively with saturated NaHCO₃ and saturated NaCl. The solution was then evaporated giving crude 6-nitrimino steroid (5a). This was applied as a solution in benzene to 1.8 kg. of neutral, activity III alumina. Elution with about 6 l. of benzene gave the diketone (6) which after crystallization from acetone weighed 56 g.; M.P. 254–257°; NMR H¹(CDCl₃, TMS) Hz. at 60 mHz. 131 (s, 3, C–21 CH₃), 121 (s at 500 Hz. s.w., 6, C–3 and C–17 OAc), 54 (d, J=8 Hz., 3, C–16 CH₃), 50 (s, 3, C–19 CH₃), 40 (s, 3, C–18 CH₃). Identical material prepared by a slightly different procedure analyzed as follows.

*Analysis.*—Calcd. for C₂₆H₃₇FO₆ (percent): C, 67.1; H, 8.03. Found (percent): C, 67.26; H, 7.95.

(d) 3β,17α - dihydroxy - 5α,6,6 - trifluoro - 16α - methylpregnane-20-one diacetate (7)

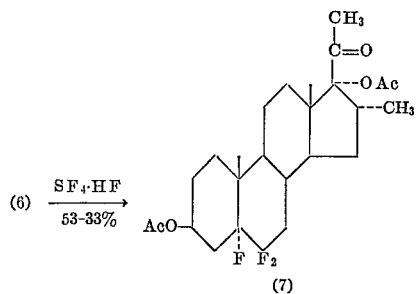

A 1 l. autoclave was charged with 75 g. of fluoroketone (6) dissolved in 300 ml. of methylene chloride. Water (7.5 ml.) was added and the autoclave was closed and cooled in Dry-Ice/acetone. The cold autoclave was evacuated and 500 g. of SF₄ was added. Sulfur tetrafluoride which had been distilled from mercury was found to give higher yields. The sealed autoclave was kept at 20°±1° for 10 hrs. with rocking and then vented. The residual liquid together with methylene chloride washings from the autoclave were combined and washed successively with water, saturated NaHCO₃, and saturated NaCl; dried over MgSO₄, filtered, and evaporated. Sometimes the residual trifluorosteroid (7) was sufficiently pure to be crystallized directly from methylene chloride-methanol. Usually, it was chromatographed on about 3 lbs. of Florisil®. The column was packed with hexane; the steroid was applied as a solution in benzene, and the column was eluted first with hexane (2 l.), then 5% acetone-hexane (ca. 2 l.), and finally 20% acetone-hexane (15 l.). Fractions were combined on the basis of NMR scans. In general, the first material to come off the column was rich in D-homoannulated trifluorosteroid (no C–18 CH₃ at 43 Hz. and no C–21 CH₃ at 131 Hz. [60 mHz. NMR]). Moderate amounts of D-homoannulated steroid were removed easily from (7) by crystallization from methylene chloride-methanol; the former is quite soluble in methanol. Most of the trifluorosteroid (7) was eluted in the 20% acetone-hexane fractions. A small amount of the starting fluoroketone (6) was eluted in the later fractions. Crystallization from CH₂Cl₂-methanol gave 25–40 g. of trifluorosteroid (7) M.P. 263°; NMR (CDCl₃, TMS) Hz. at 60 mHz. 120 (s, 3, OAc), 121 (s, 3, OAc), 131 (s, 3, C–21 CH₃), 61, 64, 67 (t, 3 total, C–19 CH₃ split by F), 54 (d, J=7 Hz., 3, C–16 CH₃), 43 (s, 3, C–18 CH₃). Analysis of an identical sample of the trifluoro steroid (7) prepared under similar conditions was as follows.

*Analysis.*—Calcd. for C₂₆H₃₇F₃O₅ (percent): C, 64.1; H, 7.68; F, 11.7. Found (percent): C, 64.10; H, 7.51; F, 11.58.

(e) 2β,17α - dihydroxy - 16α - methyl - 5α - 6,6 - trifluoropregnane-20-one 17-acetate (8)

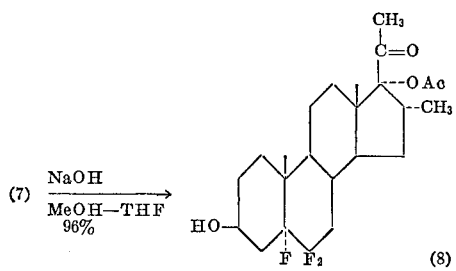

To a solution of 50 g. of the trifluorosteroid (7) in 450 ml. of tetrahydrofuran was added with stirring under nitrogen a solution of 112 ml. of 1.0 N sodium hydroxide in 300 ml. of methanol. The suspension was stirred under nitrogen for 18-24 hrs. at room temperature; within one hour the solution became clear. It was concentrated in vacuo to about 300 ml. and poured into water and extracted with ethyl acetate several times. The ethyl acetate solution was washed successively with 5% $NaHCO_3$ and water, dried, and evaporated. Crystallization from acetone-hexane gave, after drying in a vacuum oven at 60°, the monoacetate (8) as 44 g. of white solid, M.P. 211-215°. NMR spectroscope confirmed the assigned structure. An identical sample of monoacetate (8) prepared under slightly different conditions was analyzed.

*Analysis.*—Calcd. for $C_{24}H_{35}F_3O_4$ (percent): C, 64.8; H, 7.95; F, 12.8. Found (percent): C, 64.62; H, 7.36; F, 12.80.

This compound has a progestational activity.

(f) 21 - bromo - 3β,17α - dihydroxy - 5α,6,6-trifluoro-16α-methylpregnane-20-one 17-acetate (9)

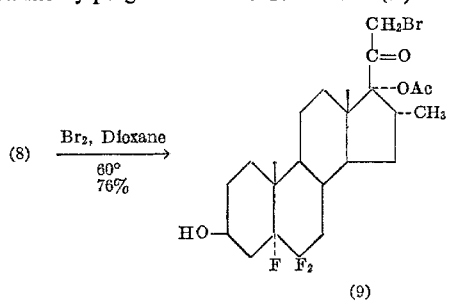

A solution of 44 g. of monoacetate (8) in 400 ml. of dioxane was kept at 60-63° and stirred while a solution of 17.7 g. (about 5.7 ml.) of bromine in 125 ml. of dioxane was added dropwise over a period of about 30-40 min. Within a few min. after addition was completed, the solution gave a negative test with moist starch-iodide test paper. The reaction mixture was immediately cooled to about 30° and rapidly evaporated to near dryness in vacuo. The residual syrup was taken up in a small amount of methanol and reevaporated in vacuo. The residual glass was crystallized from about 100 ml. of methanol giving, on combination of three successive crops and after drying at 55° in a vacuum oven for 18-24 hrs., 37-40 g. of pure 21-bromo steroid (9), M.P. 117-119°.

Alternatively, Compound 9 can be prepared by brominating the 3-acetoxy steroid (7) at about 55° to give 21 - bromo-3β,17α-dihydroxy-5α,6,6-trifluoro-16α-methylpregnane-20-one diacetate, which is hydrolyzed in aqueous methanol with HCl.

(g) 21 - bromo-17α-hydroxy-16α-methyl-5α,6,6-trifluoropregnane-3,20-dione 17-acetate (10)

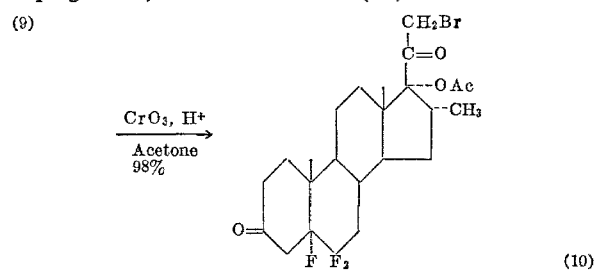

A solution of 24 g. of 21-bromosteroid (9) in 600 ml. of acetone was stirred at room temperature while a chromic acid solution (about 17 ml.) was added dropwise until a slight amber color persisted. The chromic acid solution was prepared from 26.7 g. of $CrO_3$, 23 ml. of conc. $H_2SO_4$ and water to make a final volume of 100 ml. After addition was completed the mixture was stirred for 0.5 hr. at room temperature and then decanted from the insoluble green solid. This solid was mixed with the minimum amount of water to dissolve the inorganic salts and then added with stirring back to the acetone solution. After 5 min. the mixture was slowly diluted with water to 1.8 l., cooled in ice, and filtered to collect crystalline diketone (10). The diketone, after washing well with water and drying in vacuo at 60° C. for 24 hours, weighed 23.68 g.; NMR ($CDCl_3$—TMS) Hz. at 60 mHz. 233 (s, 2, $COCH_2Br$), 130 (s, 3, OAc), 71, 73 (d, 3, C-19 $CH_3$); 57, 50 (d, 3, C-16 $CH_3$), 49 (s, 3, C-18 $CH_3$). An identical sample prepared under similar conditions had M.P. 230-234°. The compound has a progestational activity.

(h) 6,6 - difluoro - 17α,21-dihydroxy-16α-methylpregn-4-ene-3,20-dione 21-acetate (11)

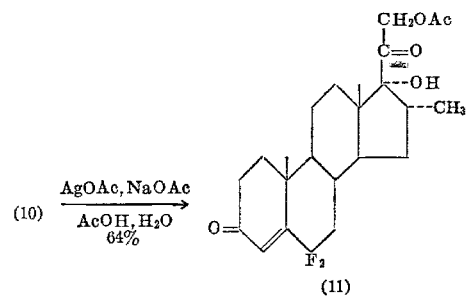

A mixture of 35 g. of sodium acetate, 500 ml. of glacial acetic acid, 25 g. of silver acetate, 2.5 ml. of water, and 25.6 g. of diketone (10) was heated at reflux temperature under nitrogen and in the dark for 1.0 hr. The black mixture was cooled, and filtered to remove silver salts, which were set aside, and the filtrate concentrated in vacuo to remove most of the acetic acid. The slush of solids and acetic acid was then mixed with 2 l. of water and filtered to collect the steroid. The steroid was washed with water and taken up in ethyl acetate. The silver salts collected earlier were washed thoroughly with ethyl acetate and the combined ethyl acetate solutions were washed with excess saturated $NaHCO_3$ and with saturated NaCl, dried, and evaporated. The residual solid was applied in benzene to 1 lb. of Florisil®. Elution first with hexane and then 20% acetone in hexane gave in the latter solvent the enone 21-acetate (11). Crystallization from acetone gave needles of enone 21-acetate (11), which, after rinsing with a small amount of cold acetone, were colorless and weighed 13.8 g. (64%); NMR ($CDCl_3$—TMS) Hz. at 60 mHz. 377, 373 (d, 1, C-4 vinyl) 295, 291 (d, 2, $CH_2OAc$), 128 (s, 3, C-21 OAc), 76.74 (d, 3, C-19 $CH_3$), 58, 51 (d, 3, C-16 $CH_3$), 48 (s, 3, C-18 $CH_3$). An identical sample prepared under similar conditions had M.P. 213-215°, $\lambda_{max}$ (EtOH) 228 (ε 12,400), $\lambda_{max}$ (CHCl₃) 2.78, 2.87, 3.37, 3.47, 5.73, 5.79, 5.93μ.

*Analysis.*—Calcd. for $C_{24}H_{32}F_2O_5$ (percent): C, 65.6; H, 7.35. Found (percent): C, 65.85; H, 7.48.

(i) 6,6 - difluoro - 17α,21-dihydroxy-16α-methylpregn-4-ene-3,20-dione (12)

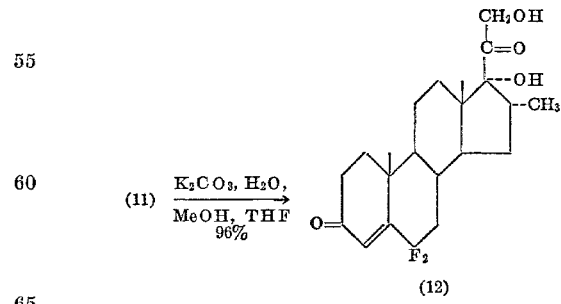

To a solution of 7.05 g. (51 mmoles) of potassium carbonate in 100 ml. of water was added 425 ml. of methanol and then 250 ml. of tetrahydrofuran. The mixture was boiled under reflux and sparged with nitrogen for one hour, then cooled to room temperature under nitrogen. The steroid enone 21-acetate (11) (21.95 g., 50 mmoles) was added and the mixture was stirred under nitrogen for two hours at room temperature. The clear, yellow solution was acidified with 5 ml. of glacial acetic acid and concentrated in vacuo to about 200 ml. The resulting slurry was then mixed with water and extracted with about 600 ml. of methylene chloride. The methylene chloride solution was washed successively with 5% NaHCO₃ and saturated NaCl, dried over Na₂SO₄ and concentrated by boiling to about 300 ml. Hot cyclohexane was then added slowly to the boiling methylene chloride and the whole was concentrated by continued boiling and vigorous stirring to about 200 ml. After cooling the mixture to room temperature the diol (12) was collected by filtration. A small second crop was collected by concentration of the mother liquor to about 75 ml. After drying at room temperature in a vacuum oven overnight the first crop (A) of (v) weighed 17.2 g. and the second crop (B) of (12) weigher 1.8 g. (96% yield). Both crops contained about ⅓ mole of cyclohexane per mole of steroid. The NMR spectra of (A) and (B) were quite similar except in the region of their spectra ascribed to COCH₂OH, i.e. crop A exhibited 4 peaks (total area 2) at approximately equal intensity at 275, 270, 267, and 262 Hz. (at 60 mHz.), whereas crop B exhibited an A,B type pattern (total area 2) having two strong sharp peaks at 274 and 266 Hz. and 2 very weak satellites at 293 and 245 Hz. According to its NMR spectrum (A) changed into isomer (B) on being heated overnight at 100°, but it retained about ⅓ mole of cyclohexane. After heating, steroid (12) had M.P. 202–207°; NMR (CDCl₃—TMS) Hz. at 60 mHz. 380, 376 (d, 1, C–4 vinyl), 293, 274, 266, 245 (two doublets [A,B], 2, COCH₂OH), 87 (s, 3.78, cyclohexane), 76.74 (d, 3, C–19 CH₃), 60.53 (a, 3, C–16 CH₃), 48 (s. 3, C–18 CH₃).

*Analysis.*—Calcd. for $C_{22}H_{30}F_2O_4 \cdot \frac{1}{3} C_6H_{12}$ (percent): C, 68.7; H, 8.90; F, 8.95. Found (percent): C, 68.62; H, 8.13; F, 8.62. $\lambda_{max}$ (EtOH) 228 m$\mu$ ($\epsilon$ 12,500, corrected for ⅓ mole cyclohexane), $\lambda_{max}^{CHCl_3}$ 2.78, 2.89, 3.41, 3.48, 5.95

$[\alpha]_D^{25}$ +1°, c.=0.5 CHCl₃; high resol. mass spec. m/e calcd. 396.2112, found 396.2118.

(j) 6,6-difluoro-11β,17α,21-trihydroxy-16α-methylpregn-4-ene-3,20-dione(13)

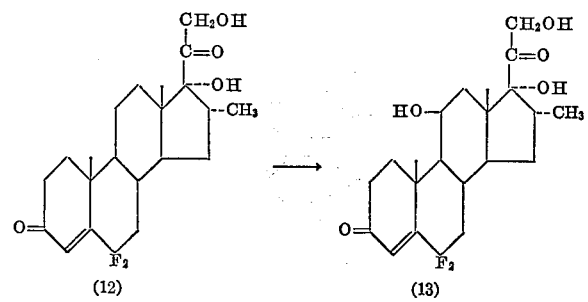

Steroid (12) was microbiologically hydroxylated by the general method described above for Step F using *Curvularia lunata* giving 6,6-difluoro-11β,17α,21-trihydroxy-16α-methylpregn4-ene-3,20-dione, M.P. about 220°.

(k) 6,6-difluoro - 11β,17α,21-trihydroxy-16α-methylpregna-1,4-diene-3,20-dione (14)

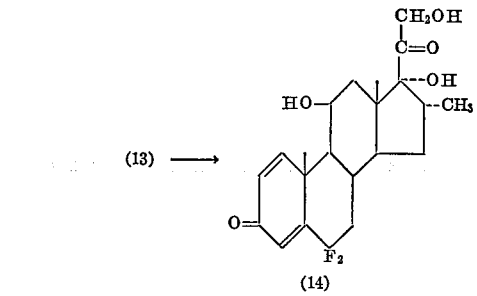

Steroid (13) is microbiologically dehydrated with *Arthrobacter simplex* by the method described above to give the corresponding Δ¹,⁴-diene (14), M.P. about 228°, $\gamma_{max}$ (EtOH) 238 m$\mu$, $\epsilon$ 14,600.

(l) 6,6-difluoro-11β,17α,21-trihydroxy-16α-methylpregna-1,4-diene-3,20-dione 21-acetate (15)

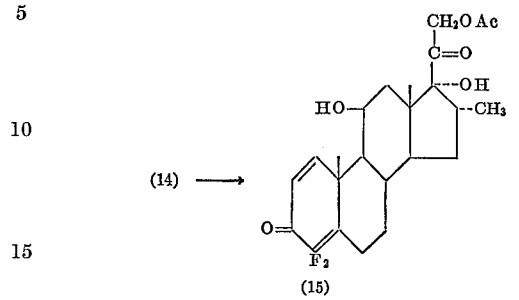

A solution of 1.0 g. of triol (14) in 51 ml. of dry pyridine under nitrogen was cooled in an ice bath and 1.0 ml. of acetic anhydride was added. The mixture was stirred overnight, letting the ice melt, and poured into about 200 ml. of water. The mixture was stirred for 0.5 hr., and the acetate collected by filtration and washed with water. After drying at 100° in vacuo the acetate (15) weighed 0.960 g. and melted at 230–232°.

(m) 6,6 - difluoro - 17α,21-dihydroxy-16α-methylpregna-1,4,9,(11)triene-3,20-dione 21 acetate (16)

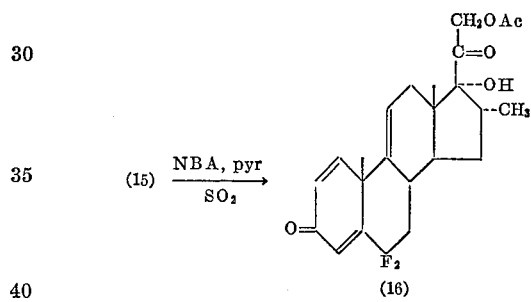

A solution of 0.959 g. of the acetate (15) and 0.375 g. of recrystallized N-bromoacetamide (NBA) in 11 ml. of dry pyridine (the success of this reaction depends on the pyridine being very dry) was stirred at room temperature for 30 min., cooled to about 10°, and a slight excess of SO₂ was added past the point when moist, acidic, starch-iodide test paper was no longer darkened. Water (35 ml.) was added dropwise and the mixture was stored at 5° overnight. White, crystalline steroid triene was collected by filtration, washed with water, and dried, giving 0.769 g. (84%) of triene (16), M.P. 151–163°; NMR (CDCl₃) at 160 mHz. 345 Hz. (2, d, J=5 Hz., C–11); TLC (silica gel, 2:1 CHCl₃-ether) $R_f$=0.30.

(n) 9α - bromo - 6,6-difluoro-11β,17α,21-trihydroxy-16α-methylpregna-1,4-diene-3,20-dione 21-acetate (17)

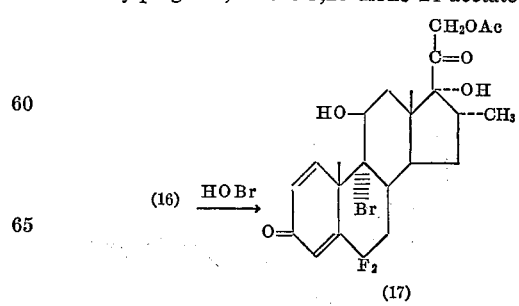

To a solution of 1.07 g. (2.5 mmoles) of the $\Delta^{1,4,9(11)}$-triene (15) in 50 ml. of peroxide-free dioxane and 1.7 ml. of 0.5 N HClO₄ was added in portions 0.70 g. (5.5 mmoles) of N-bromoacetamide (crystallized from chloroform-hexane) over about 1 hr. After 2 hrs. at room temperature, a slight excess of aqueous NaHSO₃ solution was added, and the reaction mixture was partitioned between CH₂Cl₂ and H₂O. The organic layer was washed with 5% NaHCO₃, dried, and evaporated, giving 1.44 g. of a glass which according to TLC and NMR was 70% bromohydrin and about 20% unchanged triene. Treatment of the crude bromohydrin again as above gave a glass containing about 90% bromohydrin. This glass was taken up in ethanol and re-evaporated to dryness preliminary to the next step.

(o) 6,6 - difluoro - 9β,11β-epoxy-17α,21-dihydroxy-16α-methylpregna-1,4-diene-3,20-dione 21-acetate (18)

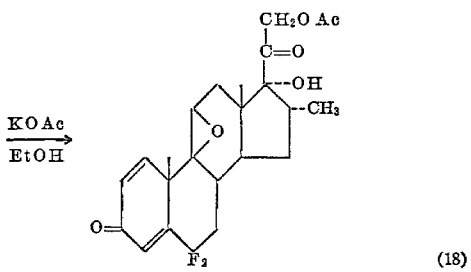

A solution of 0.94 g. of bromohydrin (17) and 1.5 g. of dry potassium acetate in 50 ml. of ethanol was heated at reflux temperature for 1 hr. and then about 25 ml. of solvent was removed by distillation at atmospheric pressure. The mixture was cooled in ice and 75 ml. of water was added dropwise. Solid was collected by filtration, washed with water, and dried at 76°/0.1 mm., giving 758 mg. (95%) of crude epoxide. Crystallization from CH₂Cl₂-methanol gave 449 mg. of crystalline epoxide (18), M.P. 211–220°; high resol. mass spec.: Calcd. for C₂₄H₂₈F₂O₆, 450.1854, measured 450.1853. The NMR spectrum of this epoxide has a sharp singlet at 94 Hz. (at 60 mHz.) corresponding to C–19 methyl. This is in contrast to all other 6,6-difluorosteroids examined, e.g. the 9α halo 11β-ols and Δ⁹,¹¹-enes, which show C–19 methyl as doublets.

Chromatography of the mother liquors from crystallization of th epoxide on Silicar CC–7® gave, on elution with 1:2 hexane-CHCl₃, 80 mg. of epoxide. Crystallization from methanol gave 39 mg., M.P. 211–218°, making the total yield of crystalline epoxide 62%.

(p) 6,6,9α - trifluoro-11β,17α,21-trihydroxy-16α-methyl-pregna-1,4-diene-3,20-dione 21-acetate (19)

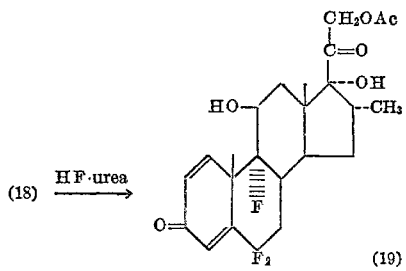

To 10 ml. of HF urea complex (prepared from 300 g. urea and 400 g. anhydrous HF) in a polyethylene bottle was added 478 mg. of epoxide (17). The reaction mixture was stirred at room temperature for 3 hrs. and then poured onto 35 ml. of concentrated ammonium hydroxide on ice. Extraction of the mixture with methylene chloride, washing the methylene chloride with water, and evaporation of the solvent, gave 483 mg. of crude product. The crude product was dissolved in about 5 ml. of chloroform, treated with 2 drops of acetic anhydride and 1 drop of pyridine, warmed slightly, and then applied to a column of 100 g. of Silicar CC–7®. Elution with EtOAc—CHCl₃ (1:9), and crystallization of the eluted material from acetone-cyclohexane gave 320 mg. (64%) of the trifluorosteroid (19), M.P. 227–231°; homogeneous by TLC on silica gel (1:1 CHCl₃-ether); λ_max (EtOH) 233 mμ (ε 14,400); HR mass spec.: calcd. for C₂₄H₂₉F₃O₆: 470.1916, meas. 470.1903; H NMR (CDCl₃)

Hz. at 60 mHz. 52, 61 (3, d, 16—CH₃), 61 (3, s, 18—CH₃), 94, 97 (3, d, 19—CH₃), 296 (2, s, 21—CH₂), 375, 378 (1, d, C—4 vinyl 385, 433, 440 (2, d, C—1,2 vinyl.)

(q) 6,6,9α-trifluoro - 11β,17α,21 - trihydroxy-16α-methylpregna-1,4-diene-3,20-dione (20) and 21-esters

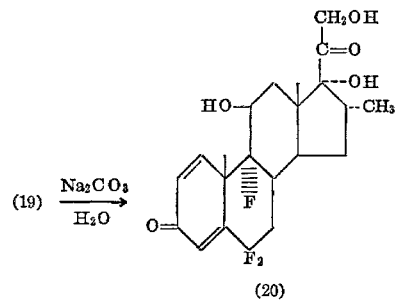

A solution of 135 mg. of potassium carbonate, 4 ml. of water, 25 ml. of methanol, and 5 ml. of tetrahydrofuran was heated at reflux temperature and sparged with nitrogen for 1 hr. and then cooled to room temperature. Steroid (19), 294 mg., was added and the solution was stirred with continued nitrogen sparging for 1.5 hrs. The mixture was concentrated in vacuo to about 10 ml., 25 ml. of water was added, and the steroid was extracted into methylene chloride. The methylene chloride was washed, dried, and evaporated, and the residue was crystallized from acetone-cyclohexane, to give 220 mg. of the triol (21), M.P. 215–218°.

Reaction of triol (20) with a variety of carboxylic acid chlorides in pyridine at room temperature gave the corresponding 21-esters, e.g.

20–b—21-cyclopropylcarboxylate (M.P. 219–221°)
20–c—21-n-butyrate (amorphous)
20–d—21-pivalate (M.P. 212–227°)
20–e—21-enanthate (glass)
20–f—21-cyclohexylcarboxylate (M.P. 210–213.5°)
20–g—21-adamantanemethanol carbonate (M.P. 229–236°)

These esters were characterized by thin layer chromatography and high resolution mass spectroscopy.

The 21-esters (e.g., the cyclopropylcarboxylic acid ester) can also be prepared by reacting the triol (14) with the appropriate acid chloride or anhydride (e.g., cyclopropylcarbonyl chloride) to give the ester corresponding to compound (15), e.g., 6,6-difluoro - 11β,17α,21-trihydroxy-16α-methylpregna-1,4-diene-3,20 - dione 21-cyclopropylcarboxylate, followed by dehydration, HOBr addition, epoxide ring formation and HF addition reactions such as in the sequence (15)→(19).

EXAMPLE 2

6,6,9α-trifluoro-11β,17α,21-trihydroxy-16α-methylpregn-4-ene-3,20-dione 21-pivalate (a) 6,6-difluoro-11β,17α,21-trihydroxy-16α-methylpregn-4-ene-3,20-dione 21-acetate (21)

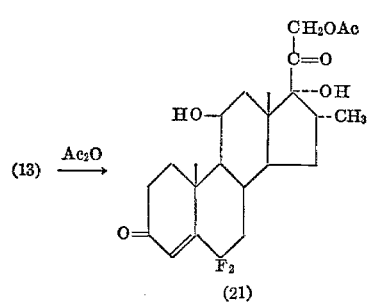

Using the general procedure of part 1 of Example 1 steroid (13) was converted to the 4-ene acetate (21), M.P. 215–218°.

(b) 6,6-difluoro - 17α,21 - dihydroxy-16α-methylpregna-4,9(11)diene-3,20-dione 21-acetate (22)

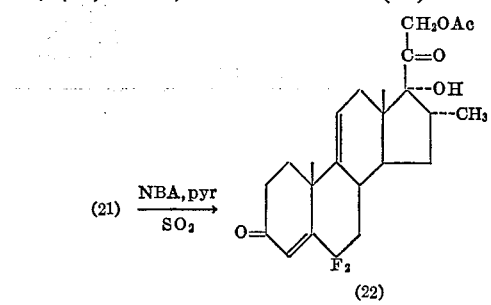

By the general procedure of part m of Example 1, steroid (21) was converted to the diene (22) in 90% yield, M.P. 207.5–208.5°; H NMR (CDCl₃) shows two doublet vinyl protons at 335 and 375 Hz. (60 mHz.).

(c) 6,6-difluoro-9α-bromo - 11β,17α,21 - trihydroxy-16α-methylpregn-4-ene-3,20-dione 21-acetate (23)

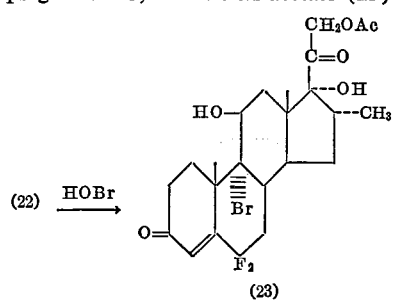

By the general procedure used in the preparation of steroid (17) in part n of Example 1, diene (22) was converted to the bromohydrin (23), M.P. 160–180° dec., in about 90% yield.

(d) 6,6-difluoro - 9β,11β - epoxy-17α,21-dihydroxy-16α-methylpregn-4-ene-3,20-dione 21-acetate (24)

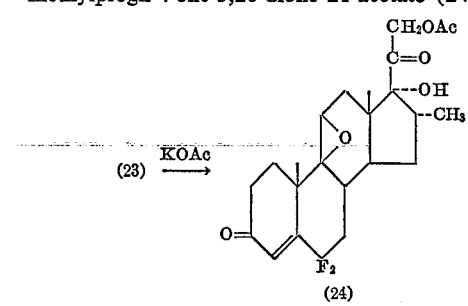

By the procedure of part o of Example 1, steroid (23) was converted to the 4-ene epoxide (24), M.P. 215–220°; the PNMR spectrum of (24) (CDCl₃, TMS) shows as a sharp singlet at 91 Hz. (60 mHz.) corresponding to C–19 methyl.

(e) 6,6,9α-trifluoro - 11β,17α,21 - trihydroxy-16α-methylpregn-4-ene-3,20-dione 21-acetate (25)

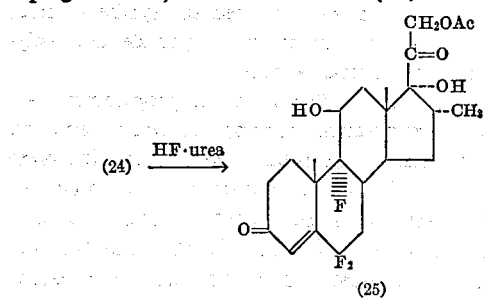

By the procedure of part p of Example 1, steroid (24) was converted to the trifluoro ene (25, M.P. 200–203° (methanol), in about 70% yield.

(f) 6,6,9α-trifluoro - 11β,17α,21 - trihydroxy-16α-methylpregn-4-ene-3,20-dione (26)

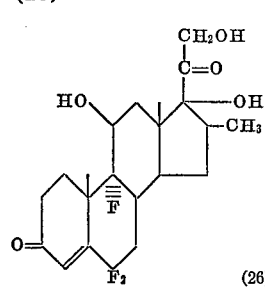

By the procedure of part g of Example 1, steroid (25) was converted to (26); M.P. 228–233° (acetone-cyclohexane); λ$_{max}$ (EtOH) 223 mμ, ε 13,800.

(g) 6,6,9α-trifluoro - 11β,17α,21 - trihydroxy-16α-methylpregn-4-ene-3,20-dione 21-pivalate (27)

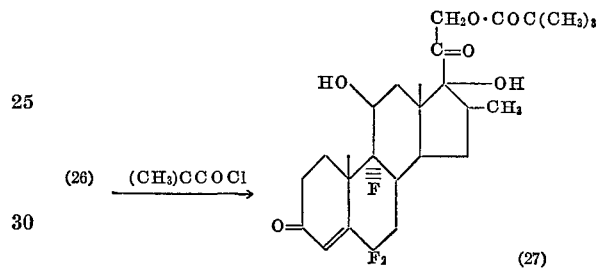

By the reaction of pivaloyl chloride in pyridine at room temperature with the trihydroxy steroid (26), there was obtained the pivalate ester (27); M.P. 203–208° (methanol), homogeneous by thin layer chromatography; HR mass spec.; calcd. for $C_{27}H_{37}F_3O_6$, 514.2524; found 514.2520.

EXAMPLE 3

5α-chloro-6,6-difluoro-3β,17α-dihydroxy-pregnane-20-one diacetate (30)

(a) 5α-chloro-3β,6β,17α-trihydroxypregnan-30-one 3,17-diacetate (28)

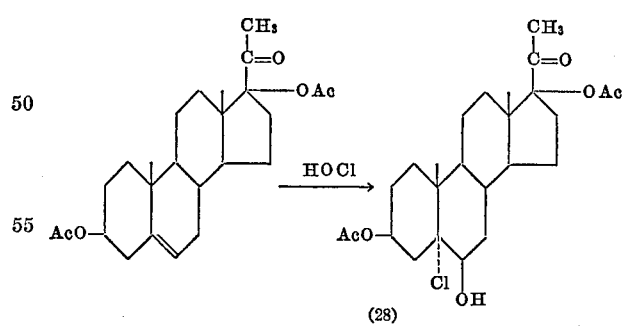

A solution of 20.8 g. of 17α-hydroxypregnenolone diacetate in 250 ml. of dioxane was stirred at room temperature, while 10 g. of N-chlorosuccinimide was added, followed by 15 ml. of water. Then, a solution prepared from 3.5 ml. of 70% perchloric acid and 15 ml. of water was added dropwise over 5 min. The solution was stirred at room temperature for 1 hr. and aqueous sodium bisulfite solution was added dropwise until a negative starch-iodide test was obtained. The mixture was poured into 1.5 l. of water, and the resulting solid was collected by filtration. Since analysis of the crude product indicated that a significant amount of unchanged starting material was present, the crude product was dissolved in fresh dioxane and re-treated with N-chlorosuccinimide, water, and aqueous perchloric acid. The crude product, isolated from water, was taken up in methylene chloride, dried, evaporated to dryness, and crystallized from acetone-hexane, giving 6.8 g. of 5α-chloro-3β,6β,17α-trihydroxypregnan-20-one, M.P. 212–214° C.

*Analysis.*—Calcd. for $C_{25}H_{37}ClO_4$ (percent): C, 64.0; H, 7.95; Cl, 7.67. Found (percent): C, 63.77; H, 8.03; Cl, 7.77.

(b) 5α - chloro-3β,17α-dihydroxypregnane-6,20-dione diacetate (29)

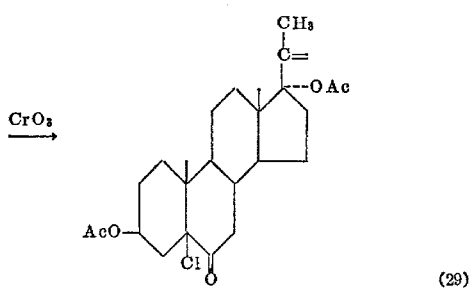

A solution of 6.5 g. of the above triol diacetate in 10 ml. of pyridine was added to a solution prepared from 6.0 g. of $CrO_3$ in 6.0 ml. of water added to 60 ml. of pyridine. The mixture was stirred at room temperature overnight, diluted with ethyl acetate, filtered, and the filtrate evaporated. Crystallization of the residue from acetone-hexane gave 4.05 g. of 5α-chloro-3β,17α-dihydroxypregnane-6,20-dione diacetate, M.P. 242–243° C.

*Analysis.*—Calcd. for $C_{25}H_{35}ClO_6$ (percent): C, 64.3; H, 7.58; Cl, 7.61. Found (percent): C, 64.44; H, 7.68; Cl, 7.75.

(c) 5α-chloro-6,6-difluoro - 3β,17α - dihydroxypregnane-20-one diacetate (30)

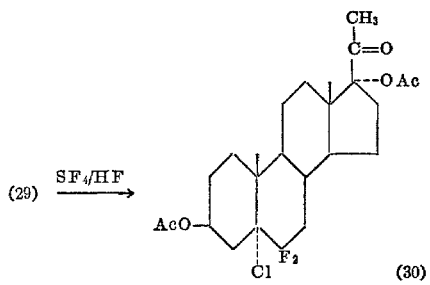

A solution of 3.0 g. of the above chlorodiketone in 25 ml. of methylene chloride and 0.4 ml. of water was treated with 30 g. of sulfur tetrafluoride for 18 hrs. at 20°±2°. The crude product was chromatographed on Florisil®, eluted with hexane and mixtures of acetone in hexane. Elution with 1:9 (by vol.) acetone-hexane gave 5α - chloro-6,6-difluoro-3β,17α-dihydroxypregnane-20-one diacetate, which was crystallized from acetone-hexane and then methanol; M.P. 200–203° C.

*Analysis.*—Calcd. for $C_{25}H_{35}F_2ClO_5$ (percent): C, 61.2; H, 7.22; F, 7.77. Found (percent): C, 61.12; H, 7.16; F, 7.57.

NMR $H^1$ ($CDCl_3$—TMS): C–19$CH_3$ two doublets (J=4 and 2.4$H_2$), C–18$CH_3$ at 39$H_2$, acetate at 122$H_2$, C–21$CH_3$ 128$H_2$ Steroid (30) can be hydrolyzed with aqueous-alcoholic sodium hydroxide to 5α-chloro-6,6-difluoro-3β,17α-dihydroxypregnane-20-one 17-acetate, which by a series of reactions analogous to Scheme 1 is converted to 6,6-difluoro-17α,21-dihydroxypregn-4-en-3,20-dione. The intermediates thus are: 21-bromo-5α-chloro-6,6-difluoro-3β,17α-dihydroxypregnane-20-one 17-acetate, 21-bromo-5α-chloro-17α-hydroxypregnane-3,20-dione acetate, and 6,6-difluoro - 17α,21-dihydroxy-4-pregnen-3,20-dione 21-acetate.

Microbiological oxidation of 6,6-difluoro-17α,21-dihydroxypregn-4-en-3,20-dione gives 6,6-difluorohydrocortisone, which has antiinflammatory activity.

6,6,9α - trifluoro - 11β,17α,21 - trihydroxy-16α-methylpregna - 1,4-diene-3,20-dione; 6,6-difluoro-11β,17α,21-trihydroxy-16α-methylpregn-4-ene-3,20-dione; 6,6,9α-trifluoro - 11β,17α,21 - trihydroxy-16α-methylpregn-4-ene-3,20-dione; 6,6 - difluoro - 11β,17α,21 - trihydroxypregn-4-ene-3,20-dione and the corresponding conventional hydrolyzable C–21 esters are some of the corticoids which can be prepared from the intermediates described. These corticoids possess good to excellent topical antiinflammatory activity as shown by the following procedure:

Topical antiinflammatory assay (rat ear assay)

Intact male 21-day-old rats (60–70 g.) were anaesthetized and the test compound in vehicle (20% pyridine, 5% distilled water, 74% diethyl ether, and 1% croton oil by volume) was applied to the left ear, 0.05 ml. to the inside of the ear and 0.05 ml. to the outside. One group of 9 rats received vehicle only, 3 groups (6–7 rats per group) received 3× dose increments of compound in vehicle, and 3 groups (6–7 rats per group) received 3× dose increments of fluocinolone acetonide, the test standard, in vehicle. Six hours later, the rats were sacrificed and ear pieces of uniform size were punched out with a No. 4 cork borer. The ear pieces were weighed, and the mean weights for the control and test substance-treated groups were calculated. Plots of percent decrease from control versus log dose were made, and the doses of compound and of test standard (in mg. per kg. of body weight) which caused a 30% reduction from control ear pieces weight were determined from dose-response lines fitted visually. ED 30% values were compared to give potency ratios of compounds with respect to fluocinolone acetonide.

TABLE OF TOPICAL ANTIINFLAMMATORY ACTIVITY

| Compound No. (Examples 1 and 2) | ED 30% reduction (mg./kg.) | | Potency ratio of test compound to fluocinolone acetonide |
|---|---|---|---|
| | Fluocinolone acetonide | Test compound | |
| 19 | 0.0055 | 0.0066 | 0.83 |
| 25 | 0.0068 | 0.025 | 0.27 |
| 26 | 0.0057 | 0.028 | 0.20 |
| 20 | 0.0046 | 0.041 | 0.11 |
| 15 | 0.0017 | 0.020 | 0.05 |
| 14 | 0.0057 | 0.029 | 0.20 |
| 20-b | 0.0040 | 0.0040 | 1.00 |
| 20-d | 0.0046 | 0.011 | 0.42 |
| 20-e | 0.012 | 0.0053 | 2.26 |
| 20-g | 0.0037 | 0.0083 | 0.45 |
| 20-c | 0.0014 | 0.0040 | 0.35 |
| 20-f | 0.0062 | 0.0048 | 1.29 |

Further pharmacological activity was also shown by the following test:

Human vasoconstrictor (Stoughton-McKenzie) assay

The method of Place et al., Arch. Derm. (Chicago), 101, 531–7 (1970) was used. The corticosteroids were dissolved in 100 ml. of methanol at a standard concentration of 0.5 or 0.05 mg. per ml., depending on their alcohol solubility. Aliquots of 5 ml. were then pipetted into identical vials and evaporated under nitrogen. Several vials were utilized to assay recovery from the desiccated vials, to test for solubility in 95% ethanol and to serve as retention samples for stability and identity. Preparation of a large number of vials in this manner resulted in identically prepared samples which permitted replicate assays.

Each coded vial of crystalline corticosteroid was sufficient for one test assay. Ten-fold serial dilutions from $1 \times 10^{-3}$ (0.1%) to $1 \times 10^{-8}$ (0.000001%) in ethanol were prepared. These were used within a week. Adult white subjects were utilized. Each subject received all of the serial dilutions randomly on one arm. Duplicate applications, differently randomized on the opposite arm, provided a check on the assay. The number of sites in each study equaled the number of preparations to be tested so that every test site received every preparation.

The skin of the forearm was prepared by washing with soap and water. The test sites were outlined by a thin film of silicone grease applied by using a rubber stamp. There were 3 or 4 horizontal and 6 or 8 vertical rows giving 18 to 32 uniform 7 x 7 mm. squares.

The square pattern reduced the problem of recognition of test sites. The grid pattern was marked with gentian violet to assist in individual site identification.

Rapid, accurate application without cross contamination of glassware was accomplished by using an individual disposable 10-lambda pipette for each application. After evaporation of the diluent the area was covered with Saran® Wrap and protected by tubular gauze. After 16 to 18 hours of occlusion, the dressings were removed and one to two hours later the sites were viewed. Two investigators read and recorded the presence or absence of vasoconstriction at each test site.

ED 50 values (the dose of compound in $\mu g./cm.^2$ which produced 50% response) were obtained from log-probit plots of dose versus percent blanching responses and given below.

TABLE OF ACTIVITY IN THE HUMAN VASOCONSTRICTOR (STOUGHTON-MCKENZIE) ASSAY

| Compound No. of Exs. 1 and 2 | ED 50 ($\mu g./cm.^2$) | Potency ratio (fluocinolone acetonide=1.00) |
|---|---|---|
| Fluocinolone acetonide | 0.046 | 1.00 |
| 19 | 0.021 | 2.19 |
| 25 | 0.35 | 0.13 |
| 26 | 0.37 | 0.12 |
| 20 | 0.16 | 0.29 |
| 15 | 0.39 | 0.12 |
| 14 | 0.72 | 0.064 |
| 20-b | 0.025 | 1.84 |
| 20-d | 0.065 | 0.71 |
| 20-e | 0.30 | 0.15 |
| 20-g | >2.0 | <0.023 |
| 20-c | 0.042 | 1.10 |
| 20-f | 0.14 | 0.33 |

The embodiments of the invention in which an exclusive property or privilege is claimed are defined as follows:

1. A process for the preparation of steroid compounds having the formula

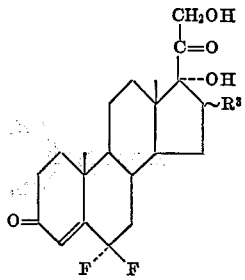

in which $R^3$ is $\alpha$- or $\beta$-hydrogen or methyl, said process comprising the sequential steps of (a) contacting a steroid compound of the formula

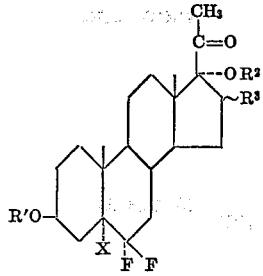

in which

X is chlorine or fluorine;

$R^1$ and $R^2$ are each hydrogen or a lower alkanoyl group; and $R^3$ is $\alpha$- or $\beta$-hydrogen or methyl, with bromine in the presence of an inert solvent selected from the class ethers and chlorinated hydrocarbons at a temperature up to about 75° C., to form the corresponding 21-bromo derivative:

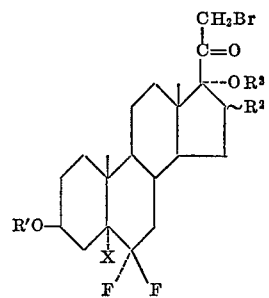

in which the meaning of $R^1$, $R^2$, $R^3$, and X is the same as above;

(b) contacting the product of step (a) where $R^1$ is hydrogen with aqueous chromic acid in the presence of a water-miscible solvent from the class ethers and ketones at a temperature of up to about 35° C., to form the 21-bromo-3-ketosteroid:

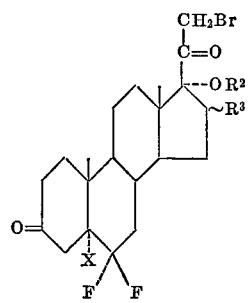

in which the meaning of $R^2$, $R^3$, and X is the same as above;

(c) contacting at about reflux temperature the product of step (b) with a mixture of sodium acetate, silver acetate, and acetic acid, there being about one mole of silver acetate per mole of starting 21-bromo-3-ketosteroid, in an inert gas atmosphere; removing inorganic salts and major portion of acetic acid; contacting the residue with water; to form the 3-keto-6,6-difluoro-17-hydroxy-21-acetyloxy-4-pregnene:

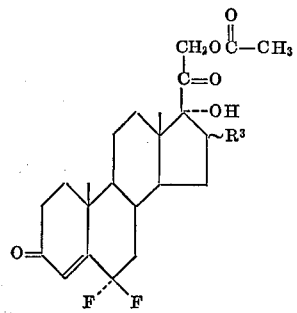

in which the meaning of $R^3$ is the same as above; and (d) contacting the product of step (c) with a base, selected from aqueous potassium carbonate, sodium carbonate and sodium hydroxide in a mixture with a water-soluble solvent from the group alcohols, ketones, and ethers, at up to about room temperature, to form the desired 21-hydroxysteroid product:

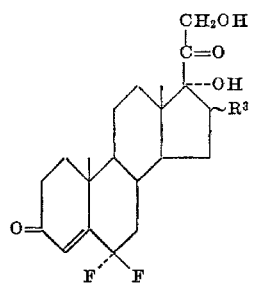

in which the meaning of $R^3$ is the same as above.

2. The process of claim 1 in which the starting steroid compound for step (a) is made by contacting the steroid compound having the formula

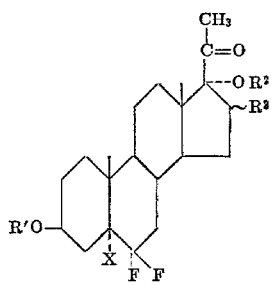

in which $R^1$ is the acetyl group; X is chlorine or fluorine; $R^2$ is hydrogen or the acetyl group; and $R^3$ is an α- or β-hydrogen or methyl, with a base selected from aqueous potassium carbonate, sodium carbonate, or sodium hydroxide in the presence of a water-miscible solvent selected from alcohols and ethers at a temperature of about —10° to 35° C.

3. The process of claim 2 in which the starting steroid compound has the following substituents:
X is fluorine,
$R^2$ is the acetyl group, and
$R^3$ is methyl.

4. The process of claim 2 in which the starting steroid compound has the following substituents:
X is chlorine, and
$R^2$ is the acetyl group.

5. The process of claim 3 in which the starting steroid compound is made from a steroid compound having the formula

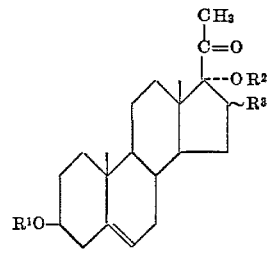

in which
$R^1$ and $R^2$ each is the acetyl group, and
$R^3$ is methyl,
by a process comprising the following sequential steps:
(a) contacting said steroid with at least about the stoichiometric amount of nitrosyl fluoride in an inert solvent selected from one or more halogenated hydrocarbons or their mixtures with glyme at a temperature of about —10° to 30° C. in the substantial absence of moisture, thereby forming the compound having the formula

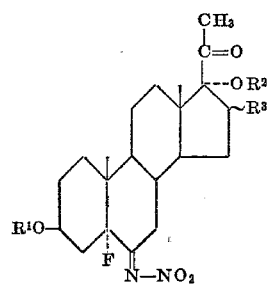

in which $R^1$, $R^2$, and $R^3$ have the same meaning as above;

(b) treating the crude solution obtained in step (a) with a weak base to remove excess NOF and acidic side products; then contacting the solution with neutral alumina containing 5–15 weight percent water, thereby forming the compound having the formula

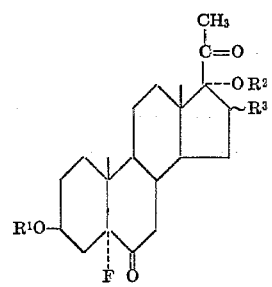

in which $R^1$, $R^2$ and $R^3$ have the same meaning as above; and (c) contacting the product of step (b) under substantially anhydrous conditions with a reagent selected from the group sulfur tetrafluoride, selenium tetrafluoride, and phenylsulfur trifluoride in the presence of a Lewis acid selected from the group hydrogen fluoride, boron trifluoride and antimony trifluoride, at a temperature of about —10° to 30° C., in an inert solvent selected from one or more halogenated hydrocarbons and their mixtures with glyme, and recovering the desired compound

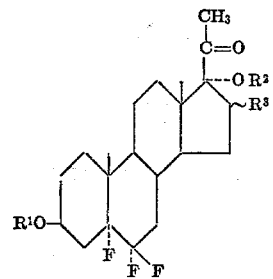

in which $R^1$, $R^2$, and $R^3$ are the same as above.

6. The process of claim 4 in which the starting steroid compound is made from a steroid compound having the formula

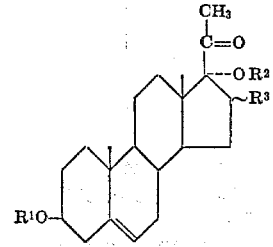

in which $R^1$ and $R^2$ each is the acetyl group, and $R^3$ is α- or β-hydrogen or methyl, by a process comprising the following sequential steps:

(a) contacting said steroid compound with hypochlorous acid in an aqueous solvent selected from a lower alcohol, ketone, or ether at a temperature of about —20° to 35° C.; destroying the excess hypochlorous acid by means of a reducing agent; thereby forming a steroid of the formula

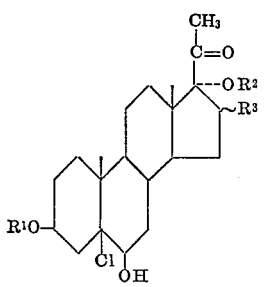

in which $R^1$, $R^2$, and $R^3$ have the same meaning as above;

(b) contacting the product of step (a), dissolved in a water-miscible solvent, with an aqueous solution of chromic acid at a temperature of up to about 35° C., thereby forming a steroid compound having the formula

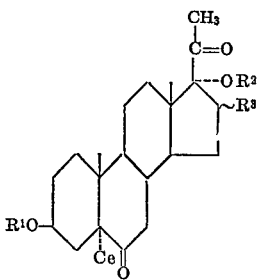

in which $R^1$, $R^2$, and $R^3$ have the same meaning as above; and (c) contacting the product of step (b) under substantially anhydrous conditions with a reagent selected from the group sulfur tetrafluoride, selenium tetrafluoride, and phenylsulfur trifluoride in the presence of a Lewis acid selected from the group hydrogen fluoride, boron trifluoride, and antimony trifluoride at a temperature of about —10° C. to 30° C. in an inert solvent selected from one or more halogenated hydrocarbons and their mixtures with glyme, and recovering the desired compound

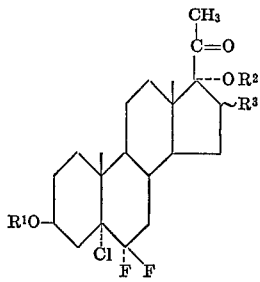

in which $R^1$, $R^2$, and $R^3$ have the same meaning as above.

7. A steroid having the formula

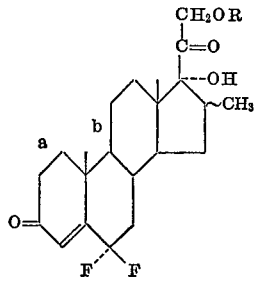

in which
R is hydrogen or lower alkanoyl;
a is a single or double bond at C–1, C–2; and
b is a double bond or the β-epoxy group at C–9, C–11.

8. A steroid compound having the formula

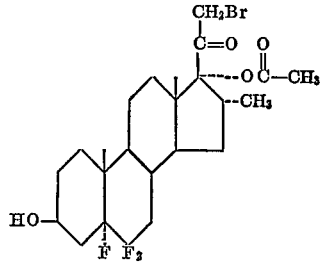

References Cited
UNITED STATES PATENTS

| | | | |
|---|---|---|---|
| 3,219,673 | 11/1965 | Boswell, Jr. | 260—397.45 |
| 3,471,477 | 10/1969 | Fried | 260—239.5 |
| 3,546,215 | 12/1970 | Fried | 260—239.55 |

ELBERT L. ROBERTS, Primary Examiner

U.S. Cl. X.R.

260—397.45, 397.47